(12) United States Patent
Kennedy et al.

(10) Patent No.: US 11,785,018 B2
(45) Date of Patent: Oct. 10, 2023

(54) MOBILE DEVICE MANAGEMENT SYSTEM FOR SECURELY MANAGING DEVICE COMMUNICATION

(71) Applicant: BANK OF AMERICA CORPORATION, Charlotte, NC (US)

(72) Inventors: Harold Joseph Kennedy, Winter Park, FL (US); Lomney Ann Bryan, Renton, WA (US); David Smiddy, Chadds Ford, PA (US); Matthew Edward Taylor, Garner, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 209 days.

(21) Appl. No.: 17/388,737

(22) Filed: Jul. 29, 2021

(65) Prior Publication Data

US 2023/0033402 A1 Feb. 2, 2023

(51) Int. Cl.
| | |
|---|---|
| *H04L 29/06* | (2006.01) |
| *H04L 9/40* | (2022.01) |
| *G06F 21/33* | (2013.01) |
| *G06F 21/57* | (2013.01) |
| *G06F 8/65* | (2018.01) |

(52) U.S. Cl.
CPC .............. *H04L 63/108* (2013.01); *G06F 8/65* (2013.01); *G06F 21/33* (2013.01); *G06F 21/572* (2013.01); *H04L 63/0823* (2013.01); *G06F 2221/2115* (2013.01); *G06F 2221/2137* (2013.01)

(58) Field of Classification Search
CPC ..... H04L 63/108; H04L 63/0823; G06F 8/65; G06F 21/33; G06F 21/572; G06F 2221/2115; G06F 2221/2137

USPC .............................................................. 726/4
See application file for complete search history.

(56) References Cited

U.S. PATENT DOCUMENTS

| | | | |
|---|---|---|---|
| 6,886,095 B1 * | 4/2005 | Hind ...................... | H04W 12/50 713/168 |
| 8,191,128 B2 | 5/2012 | Nedkov et al. | |
| 8,881,229 B2 | 11/2014 | Barton et al. | |

(Continued)

OTHER PUBLICATIONS

Panarello, "Blockchain and IoT Integration: A Systematic Survey", Aug. 6, 2018, MDPI, pp. 1-37 (Year: 2018).*

(Continued)

*Primary Examiner* — Noura Zoubair
*Assistant Examiner* — Gregory A Lane
(74) *Attorney, Agent, or Firm* — Moore & Van Allen PLLC; R.W. McCord Rayburn (57) ABSTRACT

Systems, computer program products, and methods are described herein for securely managing device communication. The present invention may be configured to provide, to another system, staging information including a digital certificate, a PIN, and a protocol for storing on a device, receive from the device a request to connect to an internal network after user input of the PIN, receive a digital certificate from the device, establish a wireless connection between the device and the internal network, and cause the device to delete the PIN. In some embodiments, the system is configured to permit communication from the device to the other system for a predetermined time window. In some embodiments, the system receives updates from the other system, via an external network, and the system sends the updates to the device, via the internal network.

20 Claims, 4 Drawing Sheets

(56) References Cited

U.S. PATENT DOCUMENTS

| | | | |
|---|---|---|---|
| 9,104,811 B1* | 8/2015 | Cohen | G06F 11/3684 |
| 9,125,057 B2 | 9/2015 | Neal et al. | |
| 9,313,660 B2 | 4/2016 | Chastain et al. | |
| 9,532,161 B2 | 12/2016 | Raleigh | |
| 9,537,868 B2 | 1/2017 | Manroa et al. | |
| 9,578,182 B2 | 2/2017 | Raleigh et al. | |
| 9,584,484 B2 | 2/2017 | Frost et al. | |
| 9,935,828 B2 | 4/2018 | Tal et al. | |
| 9,985,850 B2 | 5/2018 | Qureshi | |
| 10,097,863 B2 | 10/2018 | Avrahami et al. | |
| 10,412,052 B2 | 9/2019 | Bone et al. | |
| 10,523,710 B2 | 12/2019 | Sinha et al. | |
| 10,659,469 B2 | 5/2020 | Kling et al. | |
| 10,686,885 B2 | 6/2020 | Goyal et al. | |
| 10,764,111 B2 | 9/2020 | Chanda et al. | |
| 10,798,558 B2 | 10/2020 | Raleigh et al. | |
| 10,951,632 B2 | 3/2021 | Oz et al. | |
| 2007/0300289 A1* | 12/2007 | Tanizawa | H04L 63/08 |
| | | | 726/4 |
| 2008/0133746 A1* | 6/2008 | McCall | G06F 11/30 |
| | | | 709/224 |
| 2010/0169731 A1* | 7/2010 | Baker | H04L 1/1887 |
| | | | 714/E11.131 |
| 2014/0245417 A1 | 8/2014 | Hu et al. | |
| 2015/0181628 A1 | 6/2015 | Haverinen et al. | |
| 2015/0223283 A1* | 8/2015 | Wu | H04W 76/25 |
| | | | 370/329 |
| 2017/0310500 A1 | 10/2017 | Dawes | |
| 2018/0097818 A1* | 4/2018 | Shekh-Yusef | H04L 9/3271 |
| 2018/0129276 A1* | 5/2018 | Nguyen | G06F 3/016 |
| 2018/0167812 A1* | 6/2018 | Nagarajamoorthy | |
| | | | H04B 17/318 |
| 2018/0232937 A1* | 8/2018 | Moyer | A63F 13/71 |
| 2019/0089701 A1* | 3/2019 | Mercury | H04W 4/38 |
| 2019/0266650 A1* | 8/2019 | Chapman | G06Q 30/0609 |
| 2020/0322357 A1 | 10/2020 | Bryan et al. | |
| 2022/0276966 A1* | 9/2022 | Shcherbina | G06F 12/0653 |
| 2022/0405397 A1* | 12/2022 | Golan | G06F 8/71 |

OTHER PUBLICATIONS

De Gusman, "Security and Privacy Approaches in Mixed Reality: A literature Survey", Oct. 2019, ACM, pp. 1-41 (Year: 2019).*

* cited by examiner

MOBILE DEVICE MANAGEMENT SYSTEM FOR SECURELY MANAGING DEVICE COMMUNICATION

FIELD OF THE INVENTION

The present invention embraces a system for securely connecting and managing communication to and from a wireless device. The system is configured to manage software updates, content updates, and the transfer of analytical data to and from a third party.

BACKGROUND

Virtual reality devices may include a display for providing a virtual reality for a user and may be in the form of a head-mounted device (e.g., a headset). The display may be a stereoscopic display, and a virtual reality device may also include speakers for providing sound and motion tracking sensors for tracking motion of the user. A virtual reality device may be used for training purposes. Typically, these devices connect to networks via a hardwired hub.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for securely managing device communication is presented. The system may include at least one non-transitory storage device and at least one processing device coupled to the at least one non-transitory storage device. The at least one processing device is configured to provide staging information to another system, where the staging information includes a digital certificate, a PIN, and a protocol for enrolling a virtual reality device with the system to connect to an internal network and the other system stores the digital certificate, the PIN, and the protocol in the virtual reality device, receive, from the virtual reality device, a request to connect to the internal network, where the request is based on the protocol and where the virtual reality device generates the request based on receiving user input of the PIN, receive, from the virtual reality device, the digital certificate, establish, using the digital certificate, a wireless connection between the virtual reality device and the internal network, and cause, based on establishing the wireless connection, the virtual reality device to delete the PIN.

In some embodiments, the at least one processing device is further configured to receive a software update, via an external network, from the other system, perform safety testing on the software update to obtain safety results, determine, based on the safety results, whether the software update is safe, and provide, based on determining that the software update is safe, the software update, via the internal network, to the virtual reality device.

In some embodiments, the at least one processing device is further configured to permit, for a predetermined time window, the virtual reality device to send, via an external network, analytics data to the other system and prevent, outside of the predetermined time window, the virtual reality device from sending, via the external network, any data.

In some embodiments, the predetermined time window includes a time period that repeats on a daily basis, a weekly basis, a scheduled basis, and/or the like.

In some embodiments, the at least one processing device is further configured to prevent the virtual reality device from receiving any data from networks other than the internal network.

In some embodiments, the at least one processing device is further configured to permit the virtual reality device to send information to the other system via an external network for a predetermined, daily time window.

In some embodiments, the at least one processing device is further configured to block communication via an external network from a third party associated with the other system to the virtual reality device.

In some embodiments, the at least one processing device is further configured to validate, before establishing the wireless connection between the virtual reality device and the internal network, the digital certificate and, when establishing the wireless connection between the virtual reality device and the internal network, only establish the wireless connection between the virtual reality device and the internal network based on validating the digital certificate.

In some embodiments, the at least one processing device is further configured to receive identification information associated with the virtual reality device from the other system, where the identification information includes a serial number, a model number, a configuration of the virtual device, a unique identification number, and/or the like.

In some embodiments, the at least one processing device is further configured to receive, via an external network and from the other system, content modules for execution by the virtual reality device to train a user wearing the virtual reality device, perform safety testing on the content modules to obtain safety testing results, determine, based on the safety testing results, whether the content modules are safe, and provide, based on determining that the content modules are safe, the content modules, via the internal network, to the virtual reality device.

In some embodiments, the virtual reality device automatically connects, based on the protocol of the staging information, to the internal network.

In another aspect, a computer program product for securely managing device communication is presented. The computer program product may include a non-transitory computer-readable medium including code causing a first apparatus to provide staging information to another system, where the staging information includes a digital certificate, a PIN, and a protocol for enrolling a virtual reality device with a system to connect to an internal network, and where the other system stores the digital certificate, the PIN, and the protocol in the virtual reality device, receive, from the virtual reality device, a request to connect to the internal network, where the request is based on the protocol, and where the virtual reality device generates the request based on receiving user input of the PIN, receive, from the virtual reality device, the digital certificate, establish, using the digital certificate, a wireless connection between the virtual reality device and the internal network, and cause, based on establishing the wireless connection, the virtual reality device to delete the PIN.

In some embodiments, the non-transitory computer-readable medium includes code causing the first apparatus to receive a software update, via an external network, from the other system, perform safety testing on the software update to obtain safety results, determine, based on the safety results, whether the software update is safe, and provide, based on determining that the software update is safe, the software update, via the internal network, to the virtual reality device.

In some embodiments, the non-transitory computer-readable medium includes code causing the first apparatus to permit, for a predetermined time window, the virtual reality device to send, via an external network, analytics data to the other system and prevent, outside of the predetermined time window, the virtual reality device from sending, via the external network, any data.

In some embodiments, the predetermined time window may include a time period that repeats on a daily basis, a weekly basis, a scheduled basis, and/or the like.

In some embodiments, the non-transitory computer-readable medium includes code causing the first apparatus to prevent the virtual reality device form receiving any data from networks other than the internal network.

In some embodiments, the non-transitory computer-readable medium includes code causing the first apparatus to block communication via an external network from a third party associated with the other system to the virtual reality device.

In some embodiments, the non-transitory computer-readable medium includes code causing the first apparatus to validate, before establishing the wireless connection between the virtual reality device and the internal network, the digital certificate and, when establishing the wireless connection between the virtual reality device and the internal network, only establish the wireless connection between the virtual reality device and the internal network based on validating the digital certificate.

In some embodiments, the non-transitory computer-readable medium includes code causing the first apparatus to receive, via an external network and from the other system, content modules for execution by the virtual device to train a user wearing the virtual reality device, perform safety testing on the content modules to obtain safety testing results, determine, based on the safety testing results, whether the content modules are safe, and provide, based on determining that the content modules are safe, the content modules, via the internal network, to the virtual reality device.

In yet another aspect, a method for securely managing device communication is presented. The method may include providing staging information to another system, where the staging information includes a digital certificate, a PIN, and a protocol for enrolling a virtual reality device with a system to connect to an internal network, and where the other system stores the digital certificate, the PIN, and the protocol in the virtual reality device, receiving, from the virtual reality device, a request to connect to the internal network, where the request is based on the protocol, and where the virtual reality device generates the request based on receiving user input of the PIN, receiving, from the virtual reality device, the digital certificate, establishing, using the digital certificate, a wireless connection between the virtual reality device and the internal network, and causing, based on establishing the wireless connection, the virtual reality device to delete the PIN.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

When using a third party's service and/or device, there may be security concerns particularly when the device is managed by the third party. In an example, virtual reality devices from a third party vendor are typically stored in a hub that is hard-wired into a network for direct communication with the third party's system. The third party system sends content, software updates, and firmware updates directly to the devices. The devices send analytics data directly to the third party for analysis. This direct communication between the third party and the devices can compromise security. Therefore, there is a desire to securely manage communication between the device and the third party. In addition to security concerns, there is a desire to make these devices wireless such that the devices can be managed without a hard-wire connection through the device hub to the network.

Some embodiments described herein provide a system, a computer program product, and/or a method for securely managing device communication. For example, a system may be configured to manage and/or provide an internal network for virtual reality devices. The system may provide staging information to a third party for enrollment into the system such that a device may use the staging information to connect to the internal network. The staging information may include a digital certificate, a PIN, a protocol for enrolling the virtual reality device with the system to connect to the internal network, and/or the like. The system may receive, from the virtual reality device, a request to connect to the internal network. The system may receive, from the virtual reality device, the digital certificate. The system may establish, using the digital certificate, a wireless connection between the virtual reality device and the internal network. The PIN may be used to secure the virtual reality device in transit in the case it is lost or intercepted. The system may cause, based on establishing the wireless connection, the virtual reality device to delete the PIN.

By securely managing device communication in this manner, an entity associated with the system may control communication between the virtual reality devices and third parties. Further, the ability to manage these devices wirelessly may conserve resources (e.g., computing resources, network resources, financial resources, and/or the like) that would otherwise be consumed by unauthorized access, via the third parties, to the internal network, mitigating malicious activities performed by users that obtain unauthorized access to the internal network, repairing damage to computing resources and/or network resources caused by unauthorized access to the internal network, reporting the unauthorized access to relevant authorities (e.g., regulatory agencies, governing entities, and/or the like), and/or the like.

In some embodiments, users associated with an entity (e.g., employees of the entity) may use a virtual reality device for training during the entity's operating hours. The virtual reality device may store analytics data associated with the user's training and, at a predetermined time window, the virtual reality device may transmit the analytics data to a third party (e.g., an entity that manufactures, maintains, manages, and/or the like the virtual reality device). In some embodiments, the third party may be a virtual reality device vendor entity. In some embodiments, the third party may have software or firmware updates for the virtual reality device. In these embodiments, the third party portal may send the updates to the mobile device management system of the entity, via an external network, and the mobile device management system may confirm that the software or firmware updates are safe and secure; upon reassuring safety and security, the mobile device management system, may then send the software or firmware update via the internal network to the virtual reality device. In some embodiments, there may be a second third party system that may operate, maintain, own, and/or the like the mobile device management system, such as a trusted third party, a mobile device management vendor entity, and/or the like.

In some embodiments, the third party may send content modules (e.g., new training programs, updated training programs, additional training programs, and/or the like) to the virtual reality devices. In these embodiments, the third party portal may send the content modules to the mobile device management system, via an external network, and the mobile device management system may confirm that the content modules are safe and secure; upon assuring safety, the mobile device management system may send the content modules to the virtual reality device via the internal network. The system may allow for secure communication between the third party portal and the virtual reality device. The system may further allow the virtual reality device to connect to the system wirelessly.

As used herein, an "entity" may be any institution employing information technology resources and particularly technology infrastructure configured for processing large amounts of data. Typically, these data can be related to the people who work for the organization, its products or services, the customers, or any other aspect of the operations of the organization. As such, the entity may be any institution, group, association, financial institution, establishment, company, union, authority, and/or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, and/or the like) of the entity or enterprises affiliated with the entity, capable of operating the systems described herein. In some embodiments, a "user" may be any individual, entity, and/or system who has a relationship with the entity, such as a customer, a prospective customer, and/or the like. Additionally, or alternatively, a user may be a system performing one or more tasks described herein.

As used herein, a "user interface" may include any device and/or software that allows a user to input information, such as commands and/or data, into a device, that allows the device to output information to the user, and/or the like. For example, a user interface may include a graphical user interface (GUI) and/or an interface to input computer-executable instructions that direct a processing device to carry out specific functions. The user interface typically employs input and output devices to input data received from a user and/or output data to a user. For example, input and/or output devices may include a display, a mouse, a keyboard, a button, a touchpad, a touch screen, a microphone, a speaker, an LED, a light, a joystick, a switch, a buzzer, a bell, and/or another user input and/or output device for communicating with one or more users.

As used herein, "authentication credentials" may be any information that can be used to identify a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity (e.g., making a predefined motion with a user device), and/or the like. This authentication information may be used to authenticate the identity of the user (e.g., determine that the authentication information is associated with an account) and determine that the user has authority to access an account or system. In some embodiments, the system may be owned and/or operated by an entity. Additionally, or alternatively, the entity may employ additional computer systems, such as authentication servers, to validate and certify resources inputted by users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like.

As used herein, a "resource" may generally refer to objects, products, devices, goods, commodities, services, and/or the ability and opportunity to access and use the same. Some example implementations herein contemplate a market value of a property held by a user, including property that is stored and/or maintained by a third-party entity. In some embodiments, a resource may be stored in a resource distribution repository, such as a storage location where one or more resources are organized, stored, and/or retrieved electronically using a computing device.

As used herein, a "resource transfer," "resource distribution," and/or "resource allocation" may refer to any transaction, activities, and/or communication between one or more entities, or between the user and the one or more entities. A resource transfer may refer to any distribution of resources such as, but not limited to, a payment, processing of funds, purchase of goods or services, a return of goods or services, a payment transaction, a credit transaction, and/or other interactions involving a user's resource and/or account. In the context of an entity such as a financial institution, a resource transfer may refer to one or more of a sale of goods and/or services, a user accessing their e-wallet, and/or any other interaction involving the user and/or the user's device that invokes and/or is detectable by the financial institution. In some embodiments, a user may authorize a resource transfer using at least a payment instrument (e.g., a credit card, a debit card, a check, a digital wallet, currency, loyalty points, and/or the like), and/or payment credentials (e.g., account numbers, payment instrument identifiers, and/or the like). Unless specifically limited by the context, a "resource transfer," a "transaction," "transaction event," and/or "point of transaction event" may refer to any activity between a user, a merchant, an entity, or any combination thereof. In some embodiments, a resource transfer and/or transaction may refer to financial transactions involving direct and/or indirect movement of funds through traditional paper transaction processing systems (i.e., paper check processing) and/or through electronic transaction processing systems. In some embodiments, a resource transfer and/or transaction may refer to financial transactions involving a resource and/or resources that are borrowed, with or without collateral, with the expectation of return with or without interest.

As used herein, "third party" may refer to any person, organization, entity, and/or the like that conducts business with an entity. In some embodiments, the third party may conduct business with the entity by buying and/or selling goods and/or services As used herein, "content" and "content module" may refer to any virtual product provided by a third party to an entity.

In some embodiments, the content may include one or more audio/video files. Additionally, or alternatively, the content may include training information for users of a device (e.g., a virtual reality device) used to view and/or play the content. The terms "content" and "content module" may be used interchangeably herein.

As used herein, "analytics data" may refer to any data logged, generated, maintained, and/or the like by a device (e.g., a virtual reality device). In some embodiments, analytics data may be associated with content on a virtual reality device. For example, the analytics data may include a user's response and/or performance with respect to content viewed and/or played on the virtual reality device. The terms "analytics data" and "analytics" may be used interchangeably herein.

As used herein, "safety testing" may refer to any evaluation, method, procedure, process, and/or the like to determine whether the test subject is safe for devices associated with an entity. For example, safety testing may include one or more processes for determining whether execution of software by a device may adversely affect the device, damage the device, permit unauthorized access to the device and/or a network connected to the device, cause the device to perform an unauthorized transmission, and/or the like. In some embodiments, safety testing may refer to evaluating code (e.g., software code and/or the like) within the test subject. Additionally, or alternatively, safety testing may refer to running code within the test subject on a device in a controlled environment (e.g., in a restricted and/or isolated network environment) such that the device cannot adversely affect other devices, systems, networks, and/or the like.

Figure 1:
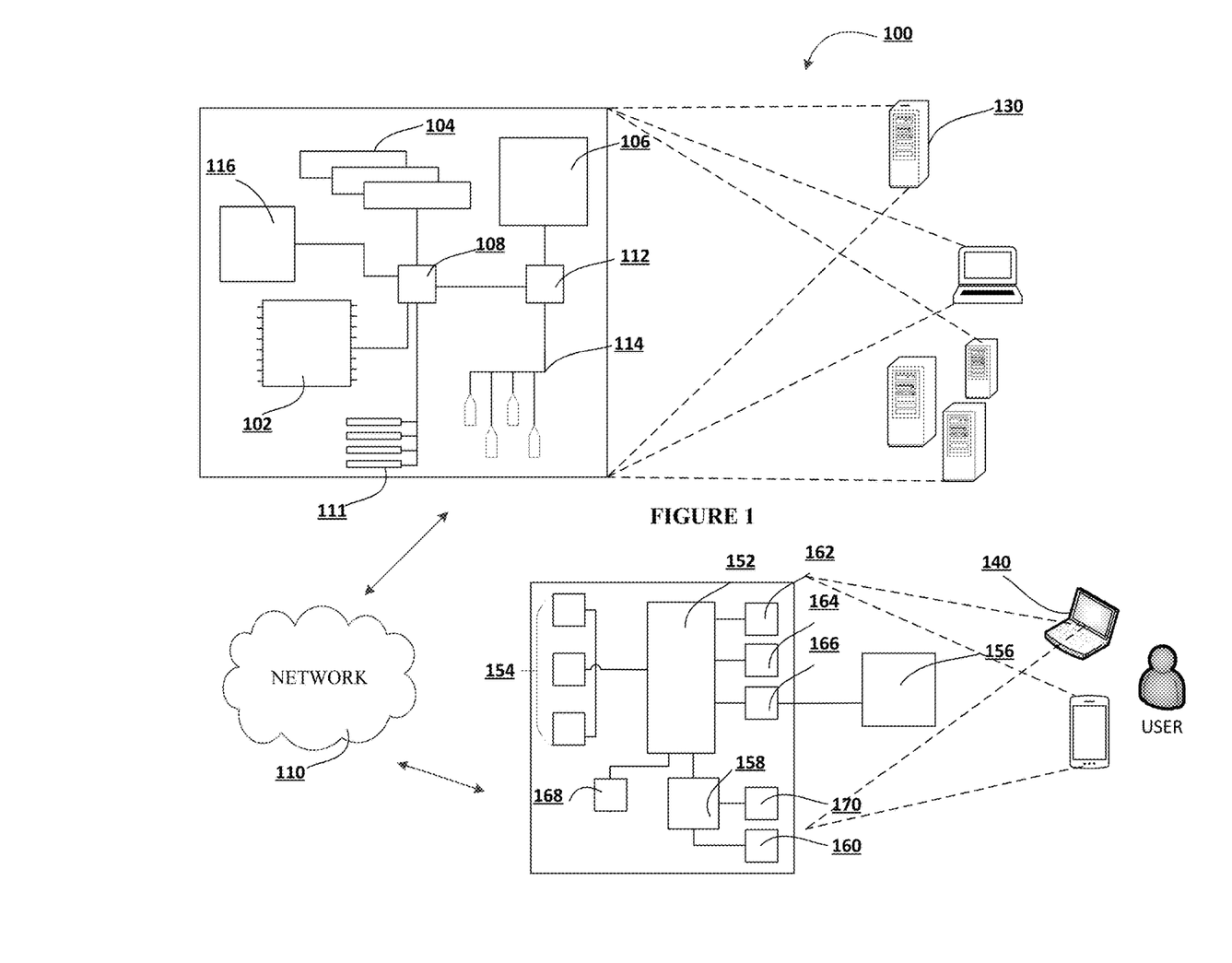
FIG. 1 illustrates technical components of a system for securely managing device communication.

FIG. 1 presents an exemplary block diagram of the system environment 100 for storing electronic digital certificates on a digital platform, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices, automated teller machine devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the entity. The system 130 may be located at the facility associated with the entity or remotely from the facility associated with the entity.

The memory 104 stores information within the system 130. In one implementation, the memory 104 is a volatile memory unit or units, such as volatile random access memory (RAM) having a cache area for the temporary storage of information. Additionally, or alternatively, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

In some embodiments, the system 130 may be configured to access, via the network 110, a number of other computing devices (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may include appropriate circuitry and be configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. Any communication between the system 130 and the user input system 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input system 140 (or any other computing devices) may provide the system 130 with permissioned to access the protected resources of the user input system 130 (or any other computing devices), which may include a GPS device, an image capturing component (e.g., camera), a microphone, a speaker, and/or any of the components described herein.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

Figure 2:
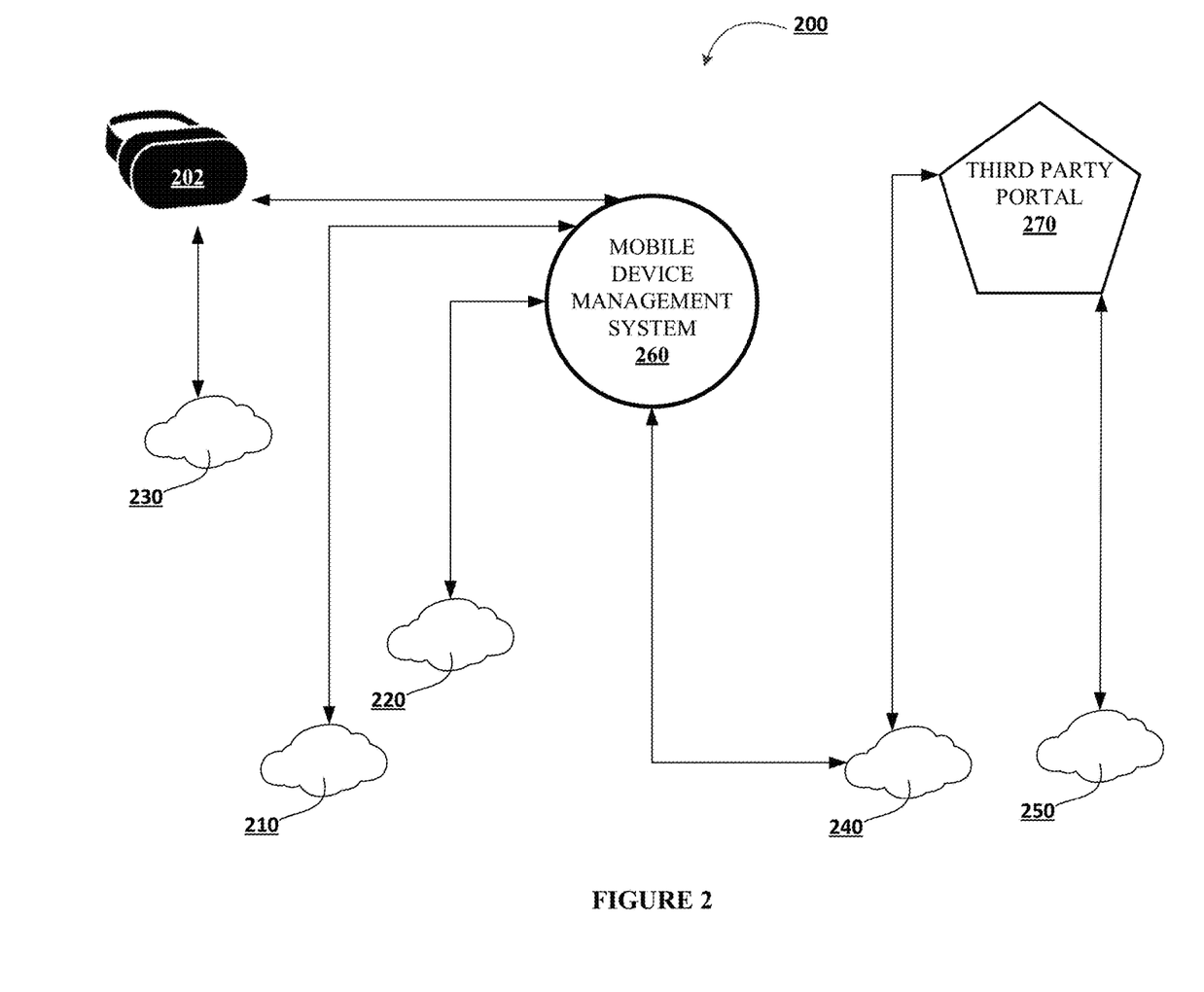
FIG. 2 illustrates a network diagram for securely managing device communication, in accordance with an embodiment of the invention.

FIG. 2 illustrates a network architecture diagram 200 as disclosed and described herein. The third party portal 270 sends information to the third party cloud server 240, which communicates with the mobile device management system 260. In some embodiments, software updates are communicated from the third party portal 270 to the third party cloud server 240 and then to the mobile device management system 260. In some embodiments, the software updates are tested for safety and confirmed safe (e.g., by the mobile device management system 260), prior to providing the software update to the virtual reality device 202, via an internal network. In some embodiments, firmware updates are communicated from the third party portal 270 to the third party cloud server 240 and then to the mobile device management system 260. In some embodiments, the firmware updates are tested for safety and confirmed safe (e.g., by the mobile device management system 260), prior to providing the software update to the virtual reality device 202, via the internal network. In some embodiments, testing the updates for safety further includes security testing (e.g. for viruses, malware, and/or the like). In some embodiments, content module updates are communicated from the third party portal 270 to the third party cloud server 240 (e.g., a cloud-based system for providing data, services, and/or the like) and then to the mobile device management system 260. In some embodiments, the content module updates are tested for safety and confirmed safe (e.g., by the mobile device management system 260), prior to providing the software update to the virtual reality device 202, via the internal network. In some embodiments, testing the updates for safety further includes security testing (e.g. for viruses, malware, and/or the like). As shown in FIG. 2, the third party portal 270 may be further connected to an identity provider 250.

The mobile device management system 260 may be connected to multiple servers, such as an NTP server 210 (e.g., a Google® NTP server), an image update service 220 (e.g., an AWS® Pico Image Update Service), and the third party cloud server 240. The mobile device management system 260 may communicate information to the virtual reality device 202. In some embodiments, the mobile device management system 260 may establish and/or manage a connection of the virtual reality device 202 to an internal network. Additionally, or alternatively, the mobile device management system 260 may perform safety testing on information sent from the third party portal 270, such as content modules, software updates, firmware updates, and/or the like. The mobile device management system 260 may determine whether the information is safe before providing the information to the virtual reality device 202. In some embodiments, safety testing includes checking for viruses, malware, and/or the like. Additionally, or alternatively, safety testing includes performance measurements, hazard analysis, and/or the like.

In some embodiments, the virtual reality device 202 may only receive information from mobile device management system 260, via the internal network. Additionally, or alternatively, the mobile device management system 260 may block communication from external networks to the virtual reality device 202. The virtual reality device 202 may store analytics data via cloud storage 230. During a predetermined time window, the analytics data on the cloud storage 230 can be communicated to the third party portal 270. In some embodiments, the predetermined time window may correspond to gaps between the entity's operating hours to avoid a decrease in network bandwidth. Additionally, or alternatively, the predetermined time window may be based on a schedule corresponding to days of the week/month/year that the entity operates. For example, if the entity is closed on a holiday, the predetermined time interval will not be scheduled for that holiday. In some embodiments, the schedule for opening the predetermined time interval can be adjusted by a user associated with the entity. In some embodiments, the virtual reality device 202 may transmit the analytics data to the third party portal 270 during the predetermined time window. For example, the virtual reality device 202 may retrieve the analytics data from the cloud storage 230 and transmit the analytics data to the third party portal 270 during the predetermined time window. Additionally, or alternatively, the cloud storage 230 may transmit the analytics data to the third party portal 270 during the predetermined time window.

The mobile device management system 260, shown in FIG. 2, may manage the virtual reality device 202. The mobile device management system 260 may enroll the virtual reality device 202 in a wireless network (e.g., a WiFi network), provide a security policy, install applications, update applications, provide firmware updates, and maintain virtual reality device health including battery life, storage capacity, and current content.

Figure 3:
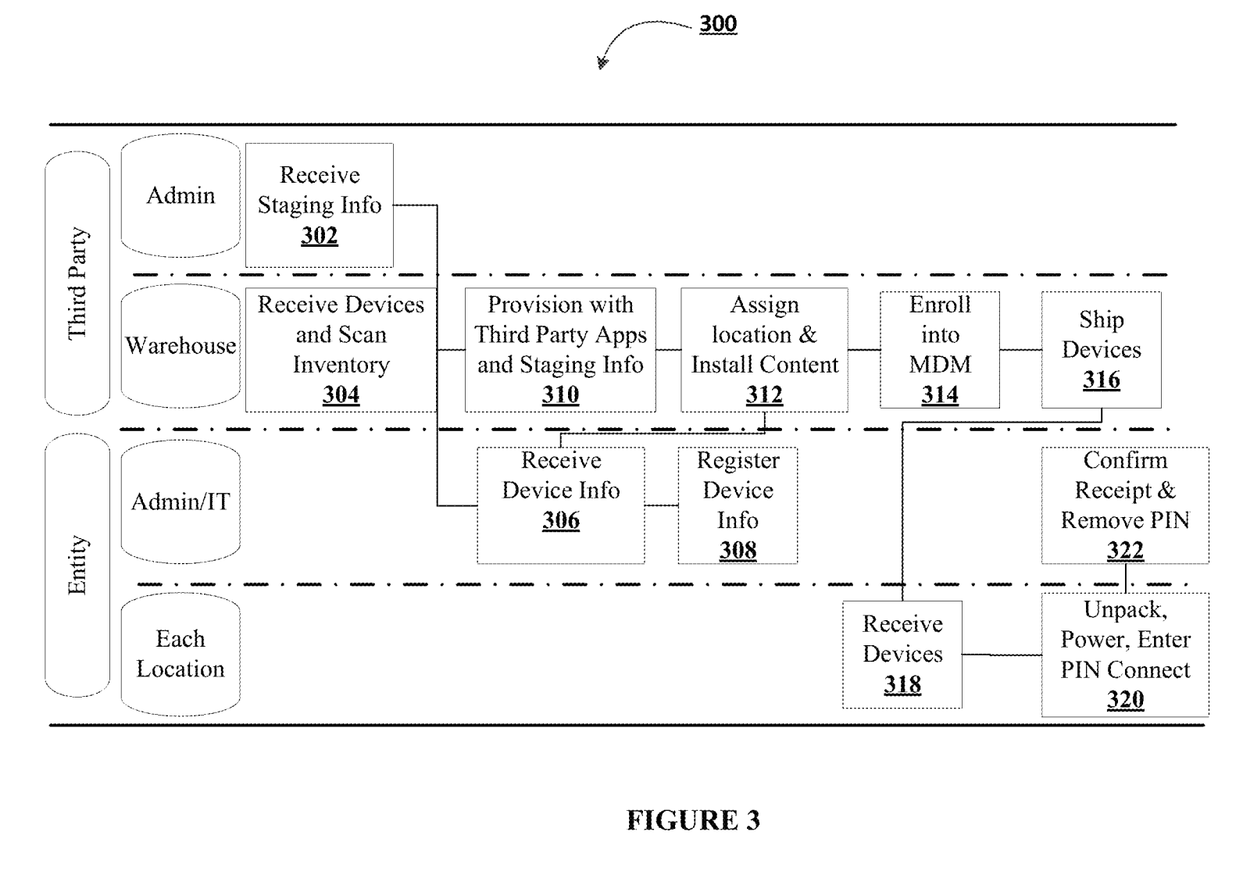
FIG. 3 illustrates a staging process for securely managing device communication, in accordance with an embodiment of the invention.

FIG. 3 illustrates a staging process 300 for securely managing device communication, in accordance with an embodiment of the invention. As shown in block 302, the third party receives, from the system, staging information, which includes a digital certificate, a PIN, and a protocol for enrolling a virtual reality device into a mobile device management system to connect to an internal network requires enrollment. As shown in block 304, the virtual reality devices are received by the third party warehouse and scanned into the inventory. As shown in block 306, the entity receives, from the third party, device information, such as a serial number, a model number, a configuration, a unique identification number associated with the virtual reality device, and/or the like. As shown in block 308, the entity registers the device information received from the third party with the system. As shown in block 310, the virtual reality devices may be connected to warehouse WiFi and provisioned with third party applications and the staging information. As shown in block 312, a location is assigned to each virtual reality device, and content is installed on the virtual reality device according to the location. As shown in block 314, the virtual reality devices are enrolled into the mobile device management (MDM) system. As shown in block 316, the virtual reality devices are shipped to their destination. As shown in block 318, the entity location (e.g., a financial institution) receives the virtual reality device. As shown in block 320, a user unpacks, powers, and inputs the PIN into the virtual reality device, and the virtual reality device connects to the internal network based on the protocol. As shown in block 322, the entity confirms receipt of the virtual reality device and the PIN is removed from the virtual reality device.

Although FIG. 3 shows an example timeline of the staging process 300, in some embodiments, staging process 300 may include additional steps, fewer steps, different steps, or differently arranged steps than those depicted in FIG. 3. Additionally, or alternatively, two or more of the steps of staging process 300 may be performed in parallel.

Figure 4:
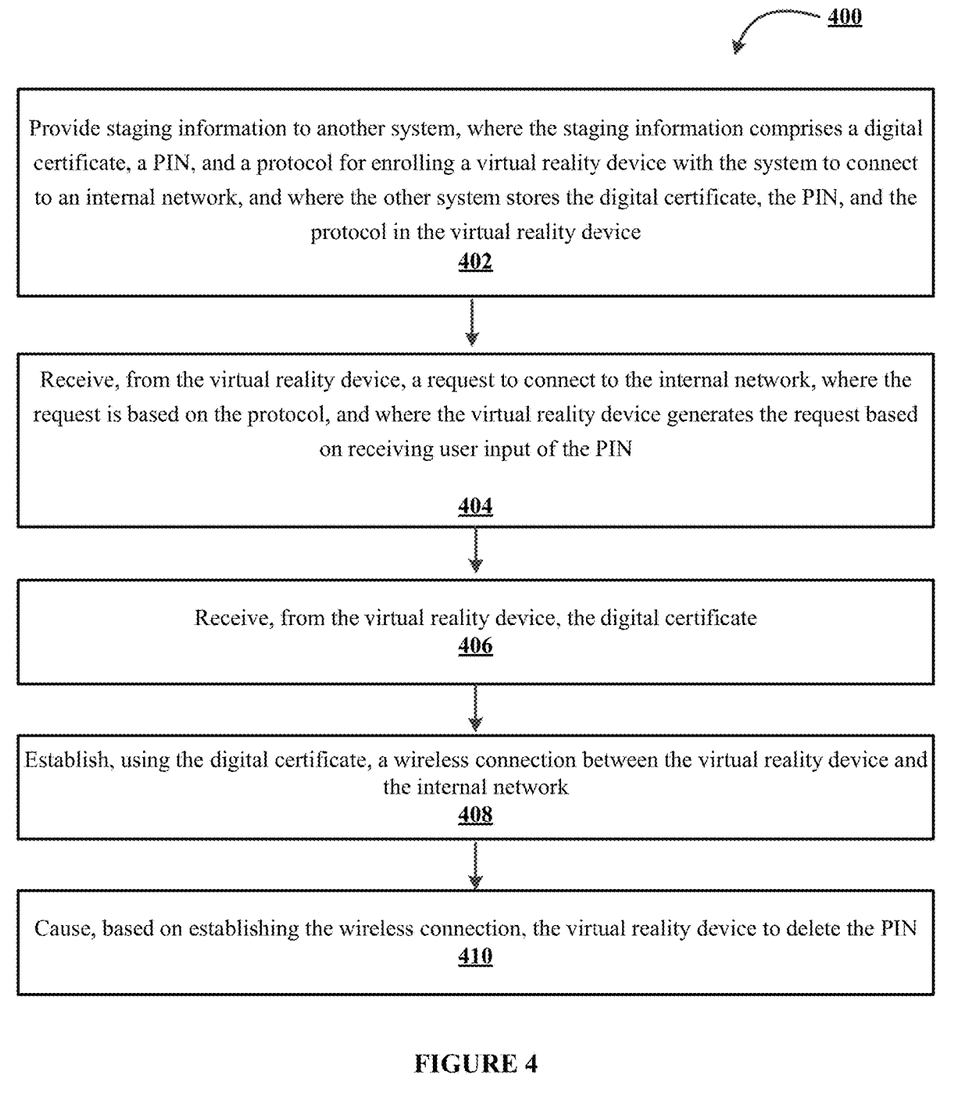
FIG. 4 illustrates a process flow for securely managing device communication, in accordance with an embodiment of the invention.

FIG. 4 illustrates a process flow 400 for securely managing device communication, in accordance with an embodiment of the invention. In some embodiments, a secure device management system and/or the like (e.g. similar to one or more of the system described herein with respect to FIG. 1) may perform one or more of the steps of process flow 400.

As shown in block 402, the process flow 400 may include providing staging information to another system (e.g., a system for provisioning virtual reality devices, a system associated with a third party entity, and/or the like), where the staging information includes a digital certificate, a PIN, and a protocol for enrolling a virtual reality device with a mobile device management system to connect to an internal network. As shown in block 404, the process flow 400 may include receiving, from the virtual reality device, a request to connect to the internal network, where the request is based on the protocol and the virtual reality device generates the request based on receiving user input of the PIN.

As shown in block 406, the process flow 400 may include receiving, from the virtual reality device, the digital certificate. In some embodiments, the system is configured to validate the digital certificate prior to establishing the wireless connection between the virtual reality device and the internal network at block 408, and only establish the wireless connection between the virtual reality device and the internal network based on validating the digital certificate. As shown in block 410, the process flow may include causing, based on establishing the wireless connection, the virtual reality device to delete the PIN.

Process flow 400 may include additional embodiments, such as any single embodiment or any combination of embodiments described below and/or in connection with one or more other processes described elsewhere herein.

In a first embodiment, the process flow 400 may include receiving a software update, via an external network, from the other system; performing safety testing on the software update to obtain safety testing results; determining, based on the safety testing results, whether the software update is safe; and providing, based on determining that the software update is safe, the software update, via the internal network, to the virtual reality device.

In a second embodiment alone or in combination with the first embodiment, the process flow 400 may include permitting, for a predetermined time window, the virtual reality device to send, via an external network, analytics data to the other system; and preventing, outside of the predetermined time window, the virtual reality device from sending, via the external network, any data.

In a third embodiment alone or in combination with any of the first through second embodiments, the predetermined time window includes a time period that repeats on a daily basis, a weekly basis, a scheduled basis, and/or the like.

In a fourth embodiment, alone or in combination with any of the first through third embodiments, the process flow 400 may include preventing the virtual reality device from receiving any data from networks other than the internal network.

In a fifth embodiment, alone or in combination with any of the first through fourth embodiments, the process flow 400 may include permitting the virtual reality device to send information to the other system via an external network for a predetermined, daily time window.

In a sixth embodiment, alone or in combination with any one of the first through fifth embodiments, the process flow 400 may include blocking communication via an external network from a third party associated with the other system to the virtual reality device.

In a seventh embodiment, alone or in combination with any one of the first through sixth embodiments, the process flow may include validating, before establishing the wireless connection between the virtual reality device and the internal network, the digital certificate; and when establishing the wireless connection between the virtual reality device and the internal network, only establishing the wireless connection between the virtual reality device and the internal network based on validating the digital certificate.

In an eighth embodiment, alone or in combination with any one of the first through seventh embodiments, the process flow may include receiving identification information associated with the virtual reality device form the other system, where the identification information includes a serial number, a model number, a configuration of the virtual reality device, a unique identification number, and/or the like.

In a ninth embodiment, alone or in combination with any one of the first through eighth embodiments, the process flow 400 may include receiving, via an external network and from the other system, content modules for execution by the virtual reality device to train a user wearing the virtual reality device; performing safety testing on the content modules to obtain safety results; determining, based on the safety testing results, whether the content modules are safe; and providing, based on determining that the content modules are safe, the content modules, via the internal network, to the virtual reality device.

In a tenth embodiment, alone or in combination with any one of the first through ninth embodiments, the virtual reality device automatically connects, based on the protocol of the staging information, to the internal network.

Although FIG. 4 shows example blocks of process flow 400, in some embodiments, process flow 400 may include additional blocks, fewer blocks, different blocks, or differently arranged blocks than those depicted in FIG. 4. Additionally, or alternatively, two or more of the blocks of process flow 400 may be performed in parallel.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for securely managing device communication, the system comprising:
at least one non-transitory storage device comprising computer-executable program code; and
at least one processing device coupled to the at least one non-transitory storage device, wherein the at least one processing device is configured to execute the computer-executable program code to:
provide staging information to another system, wherein the staging information comprises a digital certificate, a PIN, and a protocol for enrolling a virtual reality device with the system to connect to an internal network, and wherein the other system stores the digital certificate, the PIN, and the protocol in the virtual reality device;
receive identification information associated with the virtual reality device from the other system, wherein the identification information comprises at least one of a serial number, a model number, or a unique identification number;
register the virtual reality device using the identification information associated with the virtual reality device received from the other system;
receive, from the virtual reality device, a request to connect to the internal network, wherein the request is based on the protocol of the staging information, and wherein the virtual reality device generates the request based on receiving user input of the PIN of the staging information;
receive, from the virtual reality device, the digital certificate of the staging information;
establish, using the digital certificate of the staging information, a wireless connection between the virtual reality device and the internal network;
cause, based on establishing the wireless connection, the virtual reality device to delete the PIN of the staging information;
receive, via an external network and from the other system, content modules for execution by the virtual reality device to train a user wearing the virtual reality device;
perform safety testing on the content modules to obtain safety testing results;
determine, based on the safety testing results, whether the content modules are safe; and
provide, based on determining that the content modules are safe, the content modules, via the internal network, to the virtual reality device.

2. The system of claim 1, wherein the at least one processing device is configured to execute the computer-executable program code to:
receive a software update, via the external network, from the other system;
perform safety testing on the software update to obtain other safety testing results;
determine, based on the other safety testing results, whether the software update is safe; and
provide, based on determining that the software update is safe, the software update, via the internal network, to the virtual reality device.

3. The system of claim 1, wherein the at least one processing device is configured to execute the computer-executable program code to:
permit, for a predetermined time window, the virtual reality device to send, via the external network, analytics data to the other system; and
prevent, outside of the predetermined time window, the virtual reality device from sending, via the external network, any data.

4. The system of claim 3, wherein the predetermined time window comprises a time period that repeats on at least one of a daily basis, a weekly basis, or a scheduled basis.

5. The system of claim 1, wherein the at least one processing device is configured to execute the computer-executable program code to prevent the virtual reality device from receiving any data from networks other than the internal network.

6. The system of claim 1, wherein the at least one processing device is configured to execute the computer-executable program code to permit the virtual reality device to send information to the other system via the external network for a predetermined, daily time window.

7. The system of claim 1, wherein the at least one processing device is configured to execute the computer-executable program code to block communication via the external network from a third party associated with the other system to the virtual reality device.

8. The system of claim 1, wherein the at least one processing device is configured to execute the computer-executable program code to:
validate, before establishing the wireless connection between the virtual reality device and the internal network, the digital certificate; and
when establishing the wireless connection between the virtual reality device and the internal network, only establish the wireless connection between the virtual reality device and the internal network based on validating the digital certificate.

9. The system of claim 1, wherein the identification information comprises a configuration of the virtual reality device.

10. The system of claim 1, wherein the virtual reality device automatically connects, based on the protocol of the staging information, to the internal network.

11. A computer program product for securely managing device communication, the computer program product comprising a non-transitory computer-readable medium comprising code causing a first apparatus to:
provide staging information to another system, wherein the staging information comprises a digital certificate, a PIN, and a protocol for enrolling a virtual reality device with a system to connect to an internal network, and wherein the other system stores the digital certificate, the PIN, and the protocol in the virtual reality device;
receive identification information associated with the virtual reality device from the other system, wherein the identification information comprises at least one of a serial number, a model number, or a unique identification number;

register the virtual reality device using the identification information associated with the virtual reality device received from the other system;

receive, from the virtual reality device, a request to connect to the internal network, wherein the request is based on the protocol of the staging information, and wherein the virtual reality device generates the request based on receiving user input of the PIN of the staging information;

receive, from the virtual reality device, the digital certificate of the staging information;

establish, using the digital certificate of the staging information, a wireless connection between the virtual reality device and the internal network;

cause, based on establishing the wireless connection, the virtual reality device to delete the PIN of the staging information;

receive, via an external network and from the other system, content modules for execution by the virtual reality device to train a user wearing the virtual reality device;

perform safety testing on the content modules to obtain safety testing results;

determine, based on the safety testing results, whether the content modules are safe; and provide, based on determining that the content modules are safe, the content modules, via the internal network, to the virtual reality device.

12. The computer program product of claim 11, wherein the non-transitory computer-readable medium comprises code causing the first apparatus to:

receive a software update, via the external network, from the other system;

perform safety testing on the software update to obtain other safety testing results;

determine, based on the other safety testing results, whether the software update is safe; and provide, based on determining that the software update is safe, the software update, via the internal network, to the virtual reality device.

13. The computer program product of claim 11, wherein the non-transitory computer-readable medium comprises code causing the first apparatus to:

permit, for a predetermined time window, the virtual reality device to send, via the external network, analytics data to the other system; and prevent, outside of the predetermined time window, the virtual reality device from sending, via the external network, any data.

14. The computer program product of claim 13, wherein the predetermined time window comprises a time period that repeats on at least one of a daily basis, a weekly basis, or a scheduled basis.

15. The computer program product of claim 11, wherein the non-transitory computer-readable medium comprises code causing the first apparatus to prevent the virtual reality device from receiving any data from networks other than the internal network.

16. The computer program product of claim 11, wherein the non-transitory computer-readable medium comprises code causing the first apparatus to block communication via the external network from a third party associated with the other system to the virtual reality device.

17. The computer program product of claim 11, wherein the non-transitory computer-readable medium comprises code causing the first apparatus to:

validate, before establishing the wireless connection between the virtual reality device and the internal network, the digital certificate; and when establishing the wireless connection between the virtual reality device and the internal network, only establish the wireless connection between the virtual reality device and the internal network based on validating the digital certificate.

18. A method for securely managing device communication, the method comprising:

providing staging information to another system, wherein the staging information comprises a digital certificate, a PIN, and a protocol for enrolling a virtual reality device with a system to connect to an internal network, and wherein the other system stores the digital certificate, the PIN, and the protocol in the virtual reality device;

receiving identification information associated with the virtual reality device from the other system, wherein the identification information comprises at least one of a serial number, a model number, or a unique identification number;

registering the virtual reality device using the identification information associated with the virtual reality device received from the other system;

receiving, from the virtual reality device, a request to connect to the internal network, wherein the request is based on the protocol of the staging information, and wherein the virtual reality device generates the request based on receiving user input of the PIN of the staging information;

receiving, from the virtual reality device, the digital certificate of the staging information;

establishing, using the digital certificate of the staging information, a wireless connection between the virtual reality device and the internal network; and causing, based on establishing the wireless connection, the virtual reality device to delete the PIN of the staging information;

receiving, via an external network and from the other system, content modules for execution by the virtual reality device to train a user wearing the virtual reality device;

performing safety testing on the content modules to obtain safety testing results;

determining, based on the safety testing results, whether the content modules are safe; and providing, based on determining that the content modules are safe, the content modules, via the internal network, to the virtual reality device.

19. The method of claim 18, comprising:

receiving a software update, via the external network, from the other system;

performing safety testing on the software update to obtain other safety testing results;

determining, based on the other safety testing results, whether the software update is safe; and providing, based on determining that the software update is safe, the software update, via the internal network, to the virtual reality device.

20. The method of claim 18, comprising:

permitting, for a predetermined time window, the virtual reality device to send, via the external network, analytics data to the other system; and preventing, outside of the predetermined time window, the virtual reality device from sending, via the external network, any data.

\* \* \* \* \*